United States Patent [19]

Burkwall, Jr. et al.

[11] 3,984,576
[45] Oct. 5, 1976

[54] MEATLESS MARBLED, SEMI-MOIST PET FOOD

[75] Inventors: Morris P. Burkwall, Jr.; Joseph C. Leyh, Jr., both of Barrington, Ill.; John G. Reagan, Kent, Wash.

[73] Assignee: The Quaker Oats Company, Chicago, Ill.

[22] Filed: Sept. 9, 1974

[21] Appl. No.: 504,030

[52] U.S. Cl. .............................. 426/104; 426/249; 426/656
[51] Int. Cl.² ...................... A23J 1/14; A23K 1/14
[58] Field of Search .......... 426/104, 293, 272, 249, 426/1

[56] References Cited
UNITED STATES PATENTS

| | | | |
|---|---|---|---|
| 3,343,963 | 9/1967 | Kjelson | 426/104 |
| 3,380,832 | 4/1968 | Bone | 426/272 |
| 3,467,525 | 9/1969 | Hale | 426/293 |
| 3,765,902 | 10/1973 | Charter | 426/272 |
| 3,800,053 | 3/1974 | Lange | 426/364 |
| 3,840,679 | 10/1974 | Liepa | 426/104 X |
| 3,862,336 | 1/1975 | Kofsky | 426/1 |
| 3,886,298 | 5/1975 | Hayes | 426/104 |

FOREIGN PATENTS OR APPLICATIONS

| | | | |
|---|---|---|---|
| 678,416 | 1/1964 | Canada | 426/104 |
| 13,692 | 4/1972 | Japan | 426/104 |

*Primary Examiner*—Robert Halper
*Attorney, Agent, or Firm*—Mathew R. P. Perrone, Jr.; Richard H. Shear

[57] ABSTRACT

A semi-moist pet food having a marbled, meat-like texture and appearance yet entirely meatless, is described. The pet food having an appearance of meat being marbled throughout with fat is produced by utilizing vegetable protein, amylaceous ingredients, a casein salt, and a water-soluble solid capable of raising the osmotic pressure of the water within the pet food to prevent microbiological decomposition.

8 Claims, No Drawings

MEATLESS MARBLED, SEMI-MOIST PET FOOD

BACKGROUND OF THE INVENTION

1. Field of the Invention

The invention relates to a substantially solid, semi-moist pet food having an appearance and texture similar to raw meat which is marbled throughout with fat yet the pet food contains no meat.

2. Description of the Prior Art

The known processes for producing a semi-moist pet food that resembles meat being marbled throughout with fat are disclosed in U.S. Pat. No. 3,380,832 issued to David P. Bone, and U.S. Pat. No. 3,765,902 issued to Wayne M. Charter. While both processes produce a product having a marbled meat-like appearance and texture, it is to be noted that both processes require the use of substantial amounts of meat to form a platable, marbled meat-like product. Due to the scarcity of meat throughout the world, its price fluctuations, and its necessity for human consumption, it may be desirable to eliminate the use of meat in such things as pet foods. The elimination of meat in pet foods normally leads to a product that lacks palatability and is often hard and brittle. This is especially true if the meat is replaced solely by amylaceous ingredients. The present process yields a pet food that resembles known semimoist, marbled pet foods, yet is produced without the use of any meat.

SUMMARY OF THE INVENTION

It is, therefore, an object of this invention to provide a meat-like, semi-moist pet food that resembles meat being marbled throughout with fat, without the use of any meat.

Yet another object of the invention is to provide a combination of ingredients that when uses as a replacement for meat in semi-moist pet foods yields a product having a meat-like texture in appearance.

It is another object of the present invention to provide a marbled, meat-like pet food that retains a high level of palatability and acceptability to animals even though meat is not utilized.

These and other objects of the invention are accomplished by the production of a pet food from two doughs, the first dough containing a first coloring agent, and the second dough containing a second coloring agent. Each dough is produced from vegetable protein, amylaceous ingredients, a water-soluble solid, and a casein salt.

DETAILED DESCRIPTION OF THE INVENTION

In accordance with the novel aspects of the present invention, a meatless, marbled, semi-moist pet food is produced by the formation of two separate dough-like masses of material. By "meatless" pet food or "meatless" dough is meant a pet food or dough completerly devoid of meat. The term "meat" is intended to include the flesh of cattle, swine, sheep, goats, horses, whale, and other mammals, poultry and fish. It is also intended to include meat by-products as defined by Title 9, Chapter 1, Subchapter H of the CFR 1971 Edition. The term "meat by-product" is not intended to include animal fat.

The first dough contains a first coloring agent, preferably red, red-brown, or mixtures thereof, so that a meat-like appearance can be obtained while the second dough contains a second coloring agent different from the first coloring agent, preferably white, so that a fat-like appearance can be obtained. Each of the doughs is produced by utilizing from 1–30 percent by weight vegetable protein, from 0.5 to 20 percent by weight of an amylaceous ingredient, from 10–45 percent by weight of a water-soluble solute that is capable of raising the osmotic pressure of water, and from 5–30 percent by weight of a casein salt. These ingredients are admixed with sufficient water so as to obtain a dough having a final moisture content ranging between 10 percent and 75 percent by weight. It should be noted that during processing, approximately 3–5 percent of the moisture is lost. As used herein, all percentages are understood to be by weight and are based upon the final weight of the dough before processing.

A pet food utilizing the composition of the present invention may be produced in accordance with the process disclosed in U.S. Pat. No. 3,765,902. This process encompasses the formation of a first dough by a cooking-extrusion process. Before extrusion the ingredients are blended using either a sigma blade, folder or other dough type mixer. The first dough contains a coloring agent so that the appearance of lean red meat can be obtained. Similarly, a second dough having a coloring agent so that a fat-like appearance can be obtained, is formed by a cooking-extrusion process. A plurality of small strands of the second dough having a fat-like appearance is then extruded into the mass of the first dough so that a final product having an appearance of meat being marbled throughout with fat is obtained. The extrusion conditions in the method are such that the ingredients are cooked, preferably, a temperature between 190°. and 300°F. is used in the extruder. Furthermore, it is preferable that the final product contain from 70–90 percent of the first dough and from 10–30 percent of the second dough. Therefore, the extrusion rates of the two doughs should be adjusted accordingly.

Alternatively, the doughs could be admixed with one another and then shaped in a pan to form a slab of marbled meat-like pet food. The slab could then be baked at a temperature of 190°to 300°F. for a time sufficient to cook the product.

A useful coloring agent to be utilized in the formation of the first dough so that a lean, red, meat appearance is obtained is FD&C Red No. 2. A suitable coloring agent to be utilized in the second dough so that a fat-like appearance is obtained is titanium dioxide. Very small amounts of these coloring agents are required, i.e., less than 1 percent. Although FD&C Red No. 2 and titanium dioxide have been found to be suitable, it is well within the skill of the art to use coloring agents which will yield equivalent results.

By utilizing a combination of vegetable protein, amylaceous ingredients, and a casein salt, a meatless pet food having the texture and appearance of meat can be obtained. Vegetable proteins useful in the formation of the doughs utilized to form the pet food are those oil seeds and legumes as well as oil expressed or extracted meals and cakes and protein isolates or concentrates thereof recovered by acids or alkali digestion and precipitation. Examples of these vegetable protein sources are soybean, soybean meal, cottonseed meal, peanuts and peanut meal, and their extracts such as soy protein isolate and soy protein concentrate.

The amylaceous ingredient is utilized to obtain a mixing and extrusion property similar to that found in a marbled pet food of the prior art. Thus, the amylaceous ingredient aids in the viscosity of the dough, i.e., helping to absorb water, the flow of the extrudate and the setting up of the extrudate. Although corn starch is preferred, other flours and starches are found to be useful. These include all amylo pectin corn starches, acid hydrolyzed corn starch, cross-linked regular corn starches, pregelatinized wheat flour, pregelatinized corn starch and modified regular, waxy or high amylose corn starch.

By the term "modified corn starch" or "modified starch", we mean the use of thin boiling acid or oxidized treatment, or thick boiling regular grain or tuberous starch, high amylose corn starch, regular or waxy starch, or combinations thereof either pregelatinized before, after or distinct from the treatment with cross-linking agents such as sodium trimetaphosphate or phosphorus oxychloride alone or in conjunction with alkylating agents such as propylene oxide or acetylating agents such as acetic anhydride.

Casein salts are utilized not only because of their protein content but also because of their adhesion properties. These salts are nutritious and relatively stable at the extruder-cooker conditions. Preferably the salt utilized is sodium caseinate, however, calcium caseinate, magnesium caseinate, ammonium caseinate and potassium caseinate may be used as well.

By the use herein of the term "water-soluble solute" is meant any material which is soluble in water to an extent that the osmotic pressure of a water solution of such solute provides the requisite bacteriostatic effect. Examples of such water-soluble solutes are the saccharide sugars. Preferably, the sugar will be a low molecular weight sugar. It furthermore is required to be non-toxic. Among the sugars that may be used for this invention are the reducing and non-reducing, water-soluble, monosaccharides; the reducing and non-reducing polysaccharides and their degradation products such as pentoses, aldopentoses, methyl pentoses, keto pentoses such as xylose and arabinose, rhamnose, hexoses and reducing polysaccharides; aldopexoses like gludlose, galactose, mannose; the keto hexoses including fructose and sorbose, the disaccharides including maltose and lactose; the non-reducing disaccharides such as sucrose; and other polysaccharides such as dextrin and raffinose; and hydrolyzed starches which contain as their constituents oligosaccharide.

Similarly, polyhydric alcohols which produce the same effect on osmotic pressure as sugar can be used as well. By the term "polyhydric alcohols" is meant alcohols with three or more hydroxyl groups and having the general formula $HOCH_2(CHOH)_mCH_2OH$ where m is a number from 1–5. It is also intended to cover as a polyhydric alcohol 1,3-butanediol and propylene glycol. Among the polyhydric alcohols that may be used in this invention are the tritols such as glycerol; the tetritols such as erythrietol, D-threitol, L-threitol, D,L-threitol; the pentitols such as ribitol, ylitol, D-arabitol and L-arabitol; the hexitols such as allitol, ducitol, sorbitol, L-glucitol, D,L-glucitol, D-mannitol, L-mannitol, D,L-mannitol, D-talitol, L-talitol, D,L-talitol, D-iditol, L-iditol and the higher polyhydric alcohols such as glycerol-gluo-heptitol, D-glycero, D-ido-heptitol, perseitol, volemitol, and D-erythr-D-galacto-octitol. If a polyhydric alcohol is exclusively used as the water-soluble solid a maximum of 20 percent is permissible.

Antimycotics may be used also to prevent possible activity of yeast and mold growth. The sorbic acid salts such as potassium sorbate are preferred antimycotics, but other edible antimicrobial acids such as benzoates, parabans, propionates and acetates, may be used.

It is furthermore, within the scope of the invention to include vitamins, minerals, color and flavoring as supplements to the pet food. These supplements are customarily added to the pet food in an amount of less than 5 percent.

A preferred embodiment may be produced from doughs formed from 5–15 percent cornstarch, 5–15 percent soy protein isolate or soy protein concentrate, 15–35 percent sucrose, 2–10 percent propylene glycol, or 1,3-butanediol, and 5–15 percent sodium caseinate. The moisture content of the final product is preferably between 15 and 40 percent. Up to 20 percent fat could be added also to enhance the pet food properties of the food product.

In order to further illustrate the novel aspects of the present invention the following examples are presented:

EXAMPLE 1

The dry ingredients and fat ingredients listed below are thoroughly mixed in separate blenders. The resulting mixtures are then charged in separate extruders and extruded at a rate such that the weight ratio of meat-like extrudate to fat-like extrudate is approximately 4:1. The conditions in the two extruders are substantially identical. Peak temperatures within the extruder range from approximately 220° to 260°F. The pressure utilized is adequate to prevent substantial expansion of the dough within the extruder. Upon cooling, a marbled, meat-like pet food is obtained that is highly palatable.

| Percent By Weight | Dry | Fat |
|---|---|---|
| Soy protein isolate | 8 | 8 |
| Sugar | 29 | 29 |
| Sodium caseinate | 8 | 8 |
| Regular cornstarch | 15 | 15 |
| Dicalcium phosphate | 3 | 3 |
| Propylene glycol | 4 | 4 |
| Animal fat | 6 | 6 |
| Potassium sorbate | 0.2 | 0.2 |
| Vitamin/mineral supplements | 1.0 | 1.0 |
| Water | 25.78 | 25.6 |
| Red FD&C No.2/yellow 6 | .002 | — |
| Titanium dioxide | — | .20 |

EXAMPLES 2 & 3

The procedure of Example 1 is followed utilizing the ingredients listed in the examples below. In each case a palatable pet food is obtained.

| | Ex. 2 % By Weight | | Ex. 3 % By Weight | |
|---|---|---|---|---|
| | Dry | Fat | Dry | Fat |
| Alkali treated soy protein isolates | 4 | 4 | — | — |
| Sugar | 29 | 29 | 28 | 28 |
| Sodium caseinate | 16 | 16 | 8 | 8 |
| Vegetable corn starch | 10 | 10 | 5 | 5 |
| Pregelatinized wheat flour | 5 | 5 | — | — |
| Dicalcium phosphate | 3 | 3 | 3 | 3 |
| Propylene glycol | 4 | 4 | — | — |
| 1,3-butanediol | — | — | 4 | 4 |
| Soy flour | — | — | 16 | 16 |
| Animal fat | 6 | 6 | 6 | 6 |
| Potassium sorbate | 0.2 | 0.2 | 0.1 | 0.1 |
| Supplements | 1.0 | 1.0 | 1.0 | 1.0 |
| Red D&C No.2/Yellow 6 | .002 | — | .002 | — |
| Titanium dioxide | — | .20 | — | .20 |

-continued

|  | Ex. 2 % By Weight | | Ex. 3 % By Weight | |
|---|---|---|---|---|
|  | Dry | Fat | Dry | Fat |
| Water | 25.78 | 25.6 | 28.88 | 28.80 |

Palatability studies were made comparing the pet food of the invention with those containing meat. The pet food of Example 1 and similar meatless pet foods produced in accordance with the invention were compared with a pet food containing 30 percent beef tripe. When fed to dogs, 170 of 300 preferred the meatless pet food of the invention consuming 57.6 percent of that pet food in comparison to only 42.4 percent of the pet food containing meat.

Thus, the pet food of the invention is highly palatable, even though meat is not utilized. Obviously modifications of this invention are possible. It is understood, therefore, that this qpplication is intended to cover any variations, uses or adaptations of the invention as may be considered to be known or customary practice in the art to which the invention pertains.

Having fully described and disclosed the invention it is claimed:

1. A meatless, marbled, semi-moist pet food having an appearance and texture similar to raw meat consisting of from 70–90 percent by weight of a first cooked dough containing a first coloring agent and from 10–30 percent by weight of a second cooked dough containing a second coloring agent, each dough comprising from 1–30 percent of a vegetable protein; from 0.5 to 20 percent by weight amylaceous ingredients; from 10–45 percent by weight of a water-soluble solute capable of raising the osmotic pressure of the water within the dough; and from 5–30 percent by weight of a casein salt; wherein the final moisture content of each dough ranges from 15–40 percent by weight and each dough is meatless.

2. A semi-moist pet food as in claim 1 wherein said vegetable protein is derived from soy protein.

3. A semi-moist pet food as in claim 2 wherein said soy protein is selected from the group consisting of soy protein isolate and soy protein concentrate.

4. A semi-moist pet food as in claim 1 wherein said water-soluble solute is sugar.

5. A semi-moist pet food as in claim 1 wherein said water-soluble solute is a mixture of sugar and polyhydric alcohol.

6. A semi-moist pet food as in claim 1 wherein said casein salt is sodium caseinate.

7. A semi-moist pet food as in claim 1 wherein said amylaceous ingredient is a modified starch.

8. A meatless, marbled, semi-moist pet food having an appearance and texture similar to raw meat consisting of from 70–90 percent of a first cooked dough containing a first coloring agent and from 10–30 percent of a second cooked dough containing a second coloring agent, each dough comprising from 5–15 percent corn starch, from 15–35 percent sucrose, from 2–10 percent of a polyhydric alcohol selected from the group consisting of propylene glycol and 1,3-butanediol, from 5–15 percent by weight of a vegetable protein selected from the group consisting of soy protein isolate and soy protein concentrate, from 5–15 percent by weight sodium caseinate, and up to 20 percent by weight fat, wherein the final moisture content of each dough is from 15–40 percent by weight and each dough is meatless.

* * * * *